(12) United States Patent
Schartner et al.

(10) Patent No.: US 10,160,532 B2
(45) Date of Patent: Dec. 25, 2018

(54) AIRCRAFT DOOR WITH RETRACTABLE HEADER

(71) Applicant: Gulfstream Aerospace Corporation, Savannah, GA (US)

(72) Inventors: Todd Schartner, Savannah, GA (US); Clint Rupp, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 316 days.

(21) Appl. No.: 15/002,723

(22) Filed: Jan. 21, 2016

(65) Prior Publication Data

US 2017/0210460 A1    Jul. 27, 2017

(51) Int. Cl.
    *B64C 1/14*    (2006.01)

(52) U.S. Cl.
    CPC .......... *B64C 1/1461* (2013.01); *B64C 1/1423* (2013.01)

(58) Field of Classification Search
    CPC ... B64C 1/1461; B64C 1/1423; B64C 1/1469; B64C 1/1407; B64C 1/1438
    USPC ........ 49/61, 62, 63, 146, 207, 323, 372, 374
    See application file for complete search history.

(56) References Cited

U.S. PATENT DOCUMENTS

| | | | |
|---|---|---|---|
| 3,086,261 A | 4/1963 | Lapof | |
| 4,911,219 A | 3/1990 | Dalrymple | |
| 5,515,901 A | 5/1996 | Hall | |
| 6,186,444 B1 | 2/2001 | Steel | |
| 7,441,726 B2 | 10/2008 | Melberg et al. | |
| 8,763,327 B2* | 7/2014 | Harter | E04B 2/74 160/222 |
| 9,260,175 B2* | 2/2016 | Cabourg | B64C 1/1438 |
| 2006/0048466 A1 | 3/2006 | Darnell | |
| 2006/0145007 A1 | 7/2006 | Melberg et al. | |
| 2009/0199491 A1 | 8/2009 | Boldt | |
| 2013/0020439 A1* | 1/2013 | Cabourg | B64C 1/1438 244/129.4 |
| 2014/0041304 A1 | 2/2014 | Martin | |

(Continued)

FOREIGN PATENT DOCUMENTS

| | | |
|---|---|---|
| DE | 819316 C | 10/1951 |
| GB | 1504508 | 3/1978 |

OTHER PUBLICATIONS

German Patent and Trade Mark Office, Search Report for German Patent Application No. 10 2016 109 290.8 dated Mar. 17, 2017.

(Continued)

*Primary Examiner* — Philip J Bonzell
*Assistant Examiner* — Michael B Kreiner
(74) *Attorney, Agent, or Firm* — LKGlobal | Lorenz & Kopf, LLP (57) ABSTRACT

The disclosed embodiments relate to an aircraft having an interior cabin door with a retractable header. Accordingly to non-limiting embodiments, an interior cabin door for an aircraft includes a door panel having an opening in a top portion thereof. A retractable header configured to retract into the opening in the door panel as the door panel moves toward an open position. As the door panel moves toward a closed position, a lifting system is configured to raise the retractable header to interface with the ceiling of the aircraft. The lifting system includes a four-bar mechanism, a cable and pulley system and a biasing member configured to upwardly bias the retractable header.

20 Claims, 7 Drawing Sheets

(56) References Cited

U.S. PATENT DOCUMENTS

| | | | | |
|---|---|---|---|---|
| 2014/0117161 A1* | 5/2014 | Harter | .................. | B64C 1/1438 |
| | | | | 244/129.5 |
| 2015/0210373 A1* | 7/2015 | Guinnont | .............. | B64C 1/1469 |
| | | | | 244/129.5 |
| 2016/0340019 A1* | 11/2016 | Telmos | ..................... | B64C 1/10 |
| 2017/0008608 A1* | 1/2017 | Telmos | ................. | B64C 1/1461 |

OTHER PUBLICATIONS

USPTO, Final Office Action in U.S. Appl. No. 14/719,420 dated Apr. 20, 2017.
USPTO, Office Action in U.S. Appl. No. 14/719,420 dated Sep. 9, 2016.

* cited by examiner

AIRCRAFT DOOR WITH RETRACTABLE HEADER

TECHNICAL FIELD

Embodiments of the present invention generally relate to aircraft, and more particularly relate to door systems for an aircraft passenger cabin.

BACKGROUND OF THE INVENTION

Modern business aircraft typically include a well-appointed passenger cabin for the safety and comfort of aircraft passengers. Within the passenger cabin, areas or compartments are defined by bulkheads, which may include a door to separate one area from an adjoining area for privacy. Generally, the fuselage of business aircraft are round or oval in cross-section, giving the ceiling of the passenger cabin an arcuate shape. Since business aircraft typically do not have an abundance of headroom, cabin doors often have a matching arcuate header at the top of the door. However, for pivoting cabin doors, this creates a challenge for opening the door given the interface between the arcuate door header and arcuate cabin ceiling. Accordingly, some cabin doors are provided with a retractable header that allows the header to move away from the cabin ceiling into a space (or pocket) in the door panel as the door is opened. A lift mechanism returns the door header to meet the cabin ceiling as the door is closed. Conventional lift mechanisms vary in reliability, ease of operation, quite operation, improved serviceability and the ability to maintain remain in gap-free contact with the cabin ceiling. This creates a need for an improved lift mechanism for a retractable header of an aircraft cabin door.

Accordingly, it is desirable to provide an aircraft cabin door with an improved retractable header system. It is further desirable to provide an improved lift mechanism for the cabin door retractable header. Other desirable features and characteristics will become apparent from the subsequent summary and detailed description and the appended claims, taken in conjunction with the accompanying drawings and the foregoing technical field and background.

SUMMARY

The disclosed embodiments relate to an aircraft having an interior cabin door with a retractable header. According to a first non-limiting embodiment, an interior cabin door for an aircraft includes, but is not limited to, a door panel having an opening in a top portion thereof. A retractable header configured to retract into the opening in the door panel as the door panel moves toward an open position. As the door panel moves toward a closed position, a lifting system is configured to raise the retractable header to interface with the ceiling of the aircraft. The lifting system includes a four-bar mechanism, a cable and pulley system and a biasing member configured to upwardly bias the retractable header.

According to a second non-limiting embodiment, an interior cabin door system includes, but is not limited to, a bulkhead having an opening therein to receive a door panel having an opening in a top portion thereof. A retractable header configured to retract into the opening in the door panel as the door panel moves toward an open position. As the door panel moves toward a closed position, a lifting system is configured to raise the retractable header to interface with the ceiling of the aircraft. The lifting system includes a four-bar mechanism, a cable and pulley system and a biasing member configured to upwardly bias the retractable header.

According to a third non-limiting embodiment, an aircraft includes, but is not limited to, a passenger cabin having compartment defined by one or more bulkheads. At least one of the bulkhead receives a door panel that can be opened and closed. A door panel having an opening in a top portion thereof to receive a retractable header. The retractable header configured to retract into the opening in the door panel as the door panel moves toward an open position. As the door panel moves toward a closed position, a lifting system is configured to raise the retractable header to interface with the ceiling of the aircraft. The lifting system includes a four-bar mechanism, a cable and pulley system and a biasing member configured to upwardly bias the retractable header.

DESCRIPTION OF THE DRAWINGS

Embodiments of the present invention will hereinafter be described in conjunction with the following drawing figures, wherein like numerals denote like elements.

DESCRIPTION OF EXEMPLARY EMBODIMENTS

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following description.

The disclosed embodiments relate to an aircraft having a cabin door with a retractable header. Accordingly to non-limiting embodiments, a door panel includes an opening in a top portion thereof to receive a retractable header configured to retract into the opening of the door panel as the door panel moves toward an open position. A lift system is configured to upwardly bias the retractable header against the ceiling (or headliner) of the aircraft when the door panel is closed.

Figure 1:
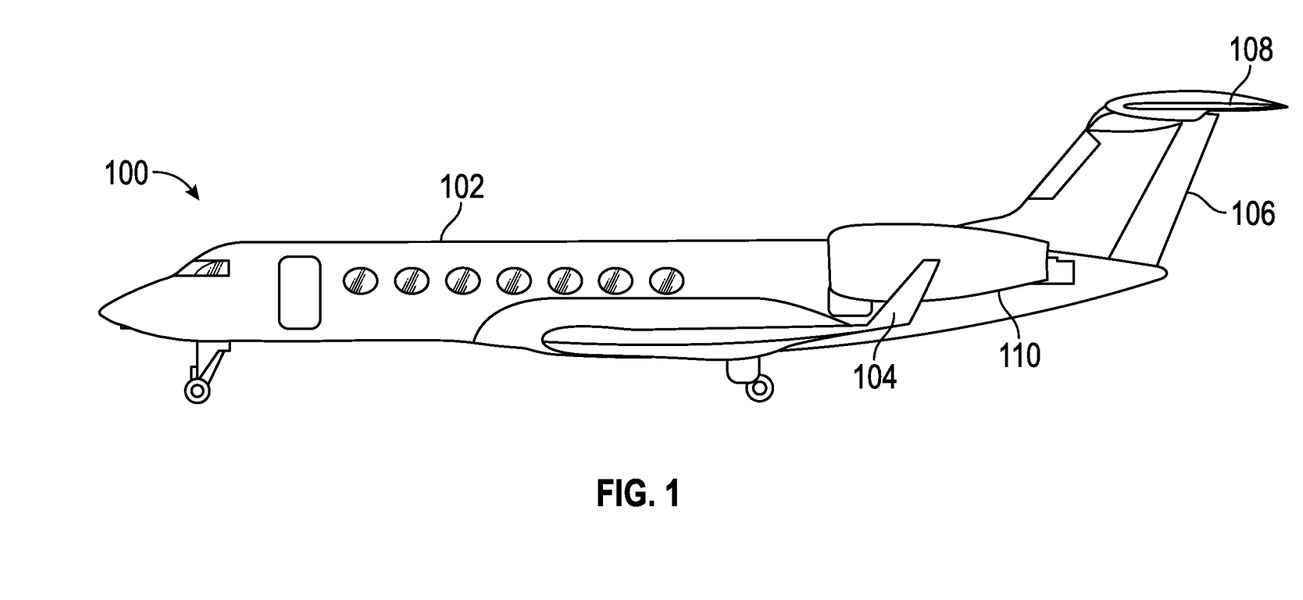
FIG. 1 is a view of an aircraft in which the disclosed embodiments can be implemented in accordance with a non-limiting implementation.

FIG. 1 is a view of an aircraft 100 in which the disclosed embodiments can be implemented in accordance with one exemplary implementation. In accordance with one non-limiting implementation of the disclosed embodiments, the aircraft 100 includes fuselage 102, which holds the passengers and the cargo; two main wings 104, which provide the lift needed to fly the aircraft 100; a vertical stabilizer 106 and two horizontal stabilizers 108, which are used to ensure a stable flight; and two engines 110, which provide the thrust needed to propel the aircraft 100 forward. Flight control surfaces are placed on wings 104, vertical stabilizer 106 and the horizontal stabilizers 108 to guide the aircraft 100.

Figure 2:
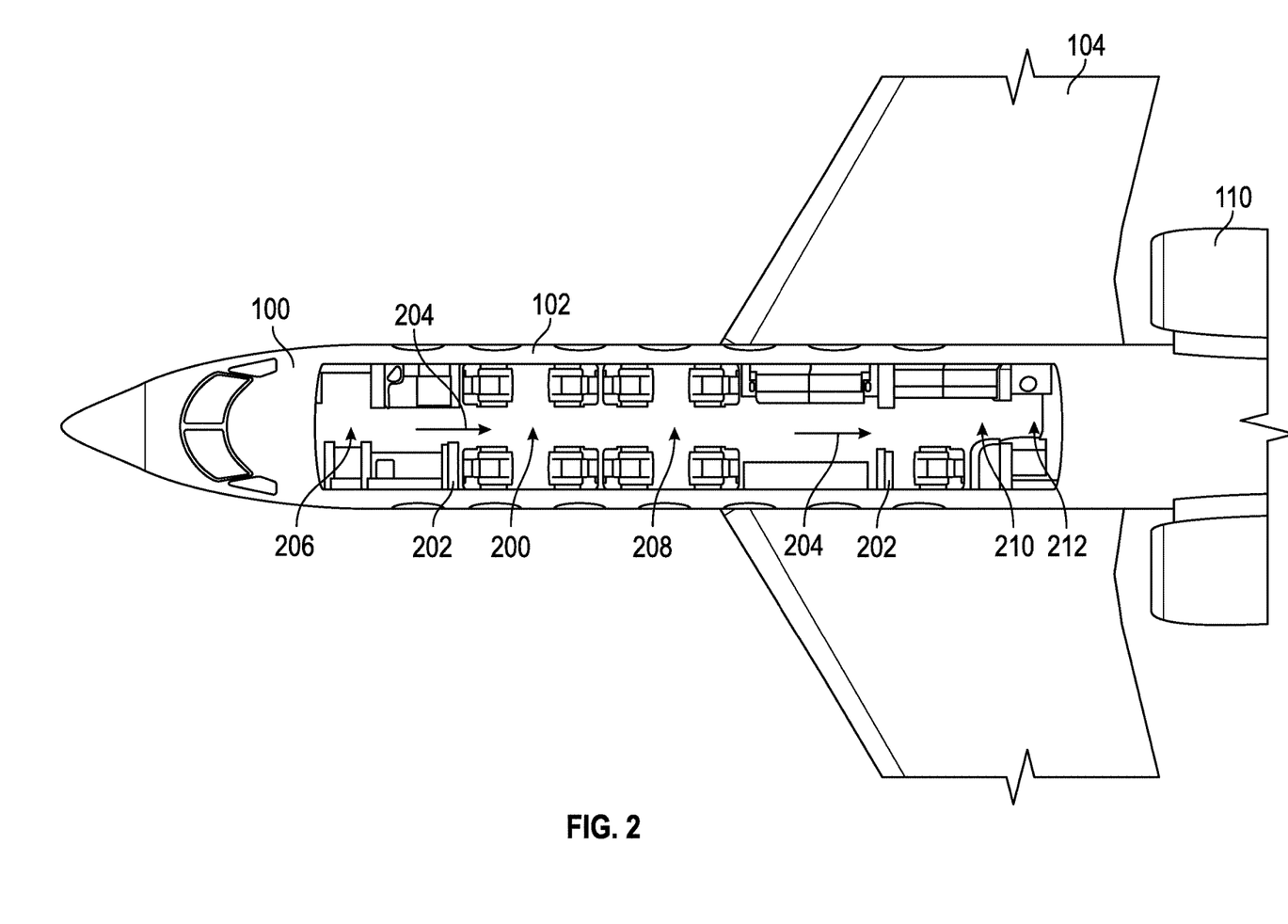
FIG. 2 is a cut-away view of the aircraft of FIG. 1 in accordance with one non-limiting implementation.

FIG. 2 is a cut-away view of the aircraft 100 to illustrate the passenger cabin 200. The passenger cabin 200 has various areas or compartments defined by bulkheads 202. In the non-limiting example of FIG. 2, four compartments are defined by the bulkheads 202; a galley area 206, a general seating area 208, a private seating area 210 and a lavatory 212. The bulkheads 202 have an opening to permit passage between the various compartments 206, 208, 210 and 212. According to non-limiting embodiments, some or all of the bulkheads 202 include a door to close one area from an adjacent area for privacy or to reduce noise. As will be appreciated by those skilled in the art, the door maybe a pivoting door, a sliding door or a folding door. The present invention provides an improved cabin door with a retractable header system that includes an improved lift mechanism as will be discussed below.

Figure 3:
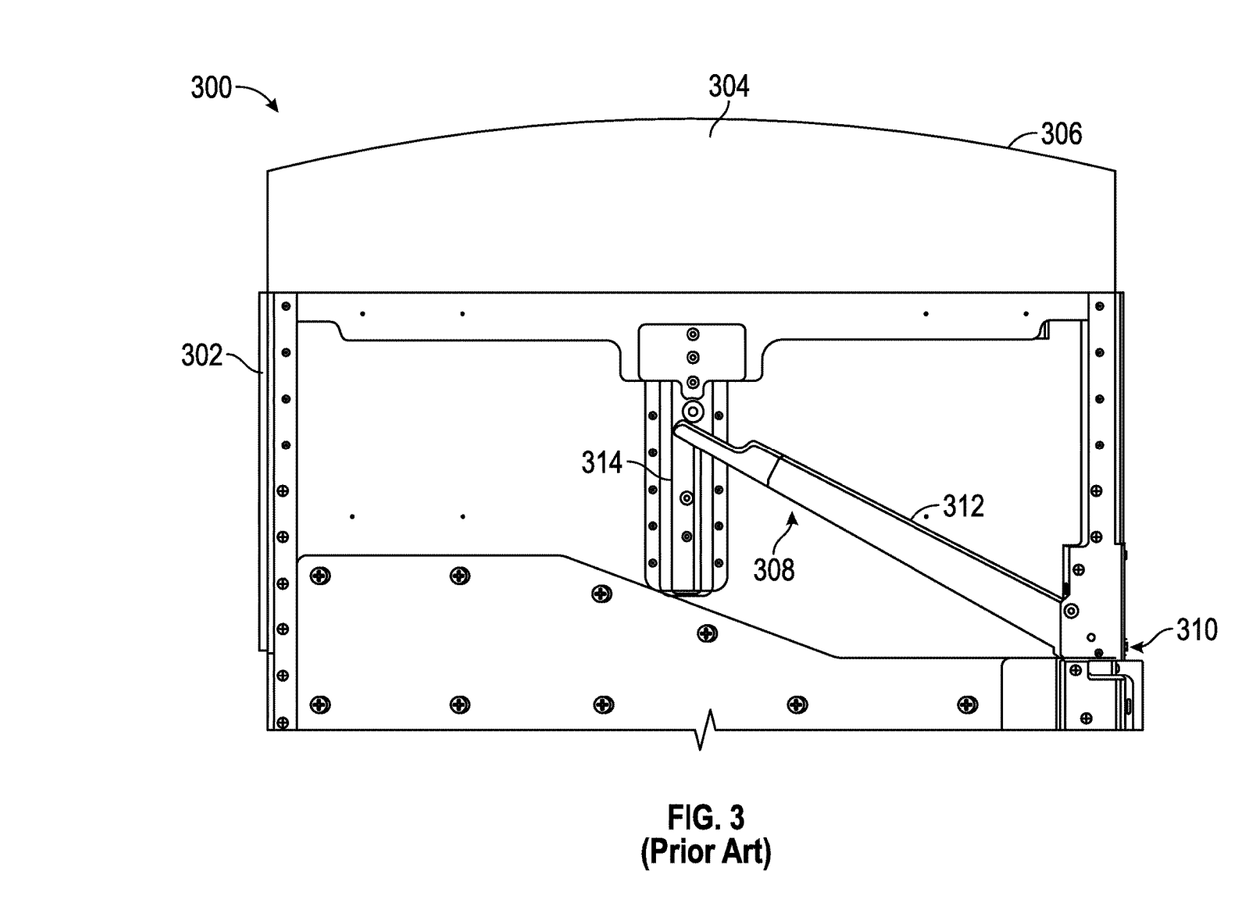
FIG. 3 is an illustration of an aircraft door with a retractable header in accordance with a conventional implementation.

FIG. 3 is an illustration of a conventional cabin door system 300. The cabin door system 300 includes door panel 302 and a retractable header 304 that resides in an opening (or pocket) on the door panel when the cabin door is in the open position. As can be seen in FIG. 3, the retractable header 304 has an arcuate top surface 306 to contact the arcuate ceiling of the cabin. A lifting mechanism 308 includes an actuator 310 (e.g., piston or plunger), a lever 312 and a guide (or slide) 314. As the door 300 moves toward the closed position, the actuator 310 causes the lever 312 to rise and the retractable header 304 rises along the guide 314. While this lift mechanism functions as designed, the mechanical advantage is low since the lever 312 must bear the full load (weight) of the retractable header 304. This can induce stress and strain on the components potentially reducing the operating time before required service of the components.

Figure 4:
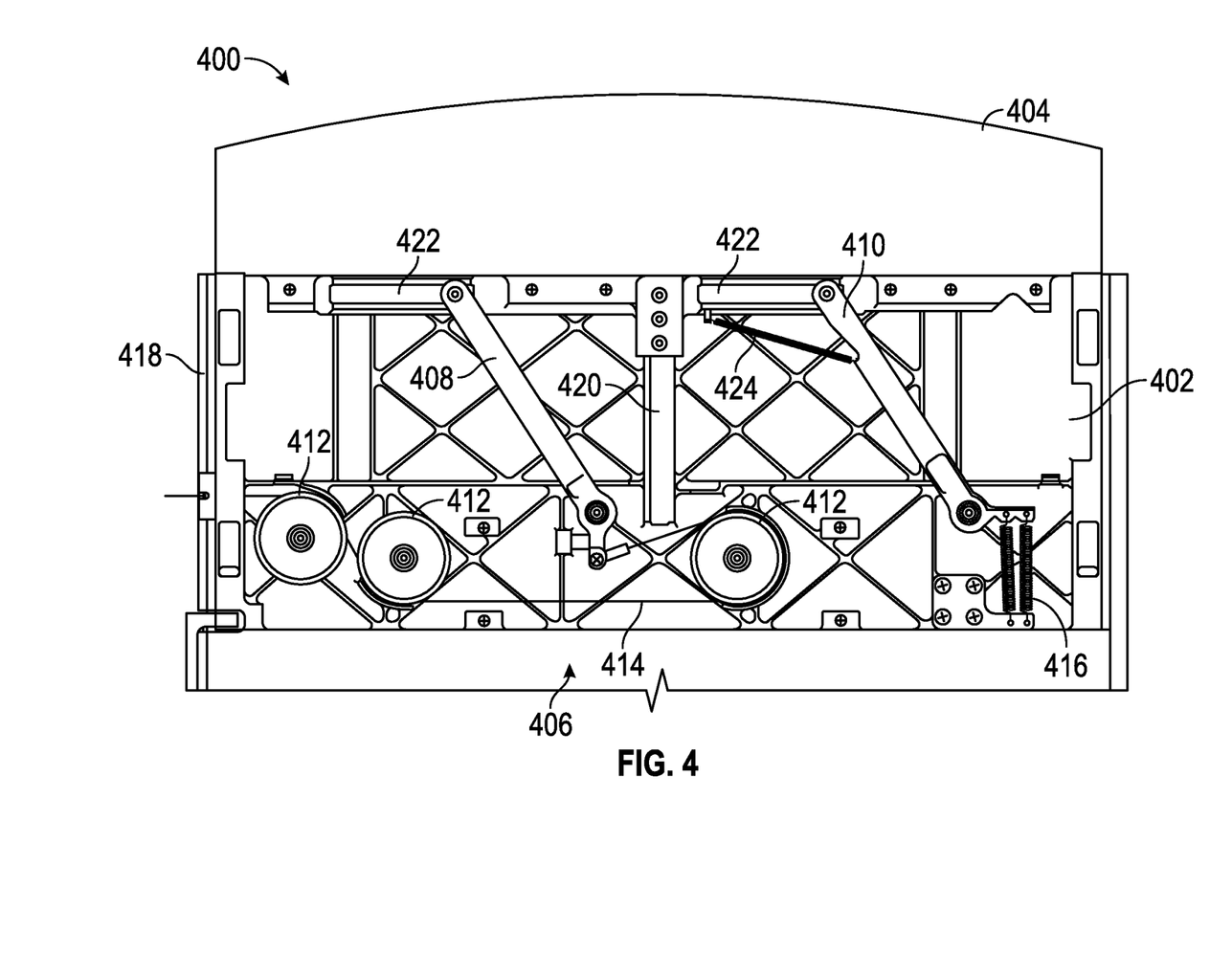
FIG. 4 is an illustration of a lift mechanism for a retractable door header in accordance with the disclosed embodiments.

FIG. 4 is a partial view of the cabin door 400 in accordance with the disclosed embodiments. As illustrated in FIG. 4, the door panel 402 receives a retractable header 404 that is configured to interface with (or against) the ceiling (or a headliner) of the aircraft. A lifting system 406 is provided to maintain the retractable header in a raised position when the door panel 402 is in the closed position. The lifting system 406 consists of a four-bar mechanism that includes a first bar 408 and a second bar 410. Each of the first bar 408 and the second bar 410 have one end coupled to the door panel 402 and the other end coupled to the retractable header 404. The lifting system also includes a cable and pulley system having one or more pulleys 412 coupled to the door panel 402 and a cable 414. Although three pulleys are illustrated in FIG. 4, those skilled in the art will appreciate the more or fewer pulleys could be used in any particular implementation. The cable 414 is coupled at one end to a bulkhead (not shown in FIG. 4 and best seen in FIG. 7) in which the door panel is installed. The opposite end of the cable 414 is coupled to the four-bar mechanism at bar 408. A biasing member 416 of the lifting system 406 upwardly biases the retractable header 404. In some embodiments, the biasing member 416 comprises one or more springs depending upon the upward bias force needed in any particular implementation. The biasing member 416 is coupled to the door panel 402 and the four-bar system at bar 410 and operates to cause the four-bar system to raise the retractable header 402 when the door panel moves toward the closed position.

In operation, as the door panel moves toward the open position, cable 414 is placed under tension via a cam 418 mounted to a side of the door panel 402. The cable causes the bar 408 and 410 of the four-bar system to retract into the door panel 402. The door panel 402 includes a guide (or slide rail) 420 that guides the retracting header as it moves into the door panel 402 toward a retracted position, while guides (slide rails) 422 in the retractable header 404 receive and guide bar 408 and 410 assisted by a tension member 424. In some embodiments, the tension member 424 comprises a spring. As the door panel moves toward the closed position, the process reverses as tension is removed from the cable 414. Biasing member 416 contracts causing bar 408 and 410 to raise the retractable header 402 toward a raised position to interface with the aircraft ceiling when the door panel 402 is in the closed position. As compared to conventional lifting mechanisms (see FIG. 3) the cable and pulley system 406 offers an advantage in that the operational lifespan of the door is increased due to the improved mechanical advantage offered by the cable and pulley system 406. Moreover, ease of serviceability is greatly increased, while the user effort required to operate the door is decreased. These factors and the improved ability to block light transmission give users an increased perception of door quality.

Figure 5:
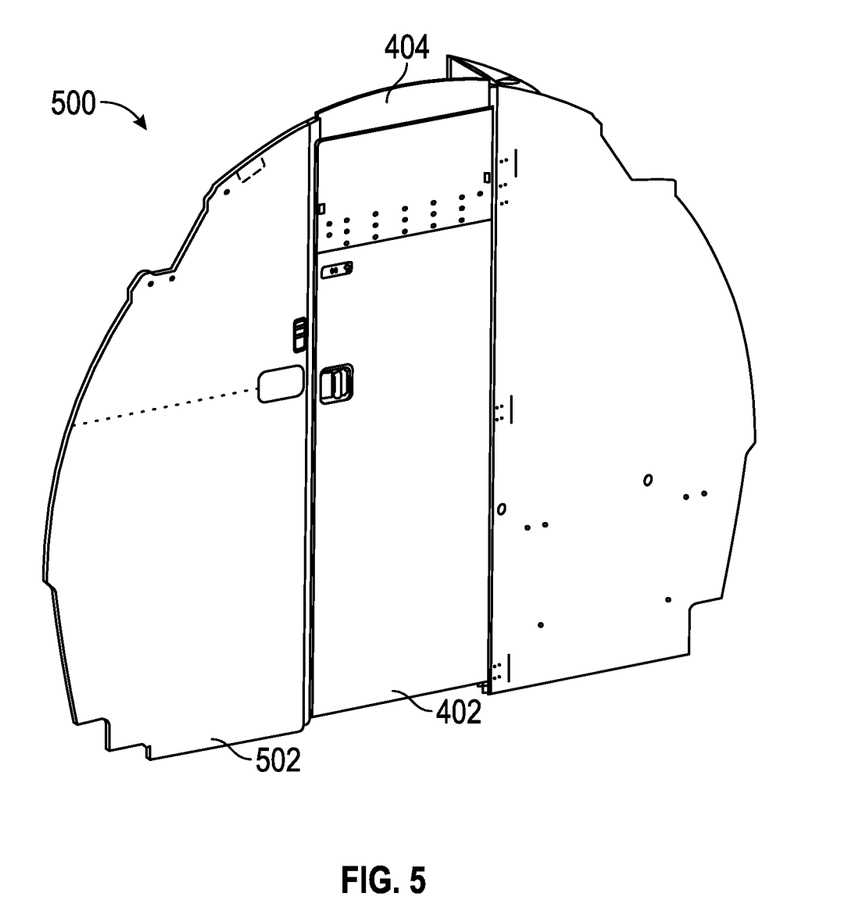
FIG. 5 is a perspective view of an aircraft cabin door in a closed position in accordance with the disclosed embodiments.
Figure 6:
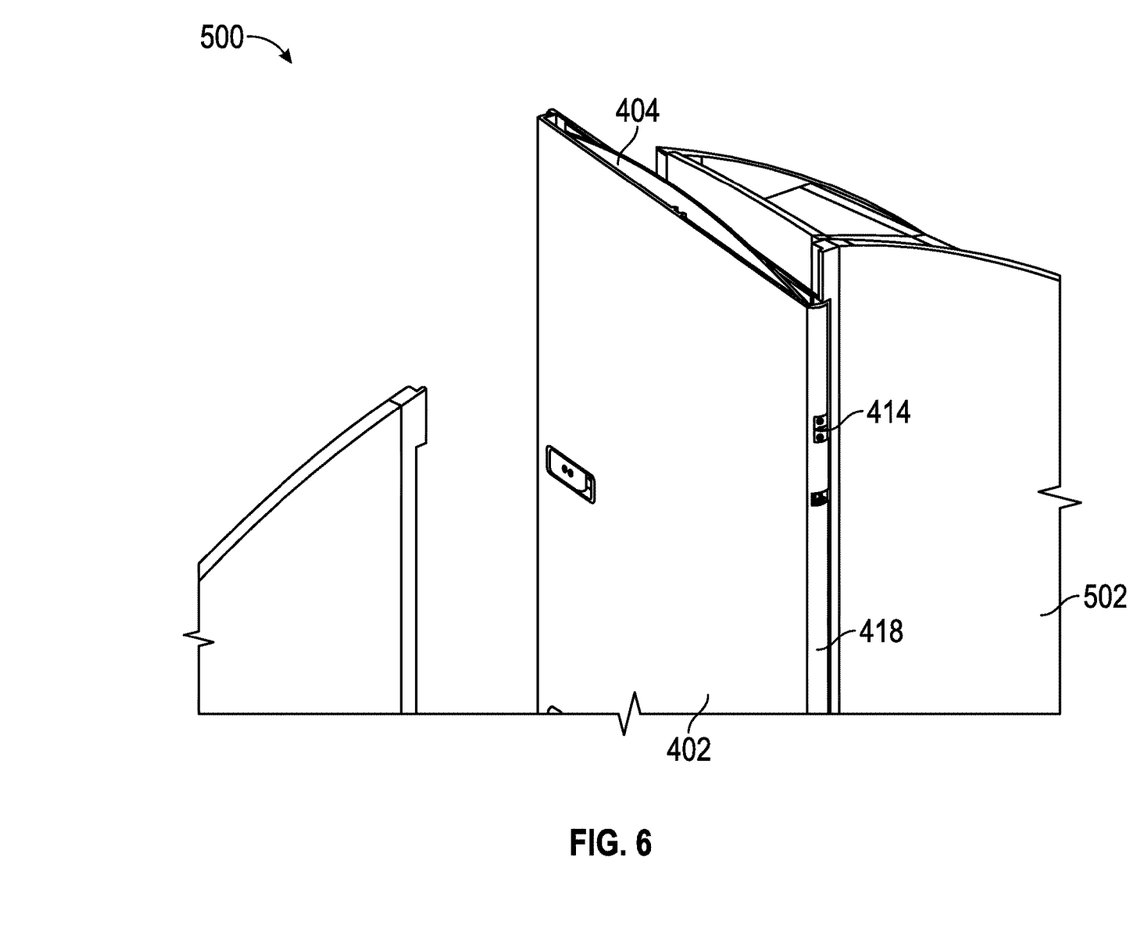
FIG. 6 is a perspective view of an aircraft cabin door in an open position in accordance with the disclosed embodiments.
Figure 7:
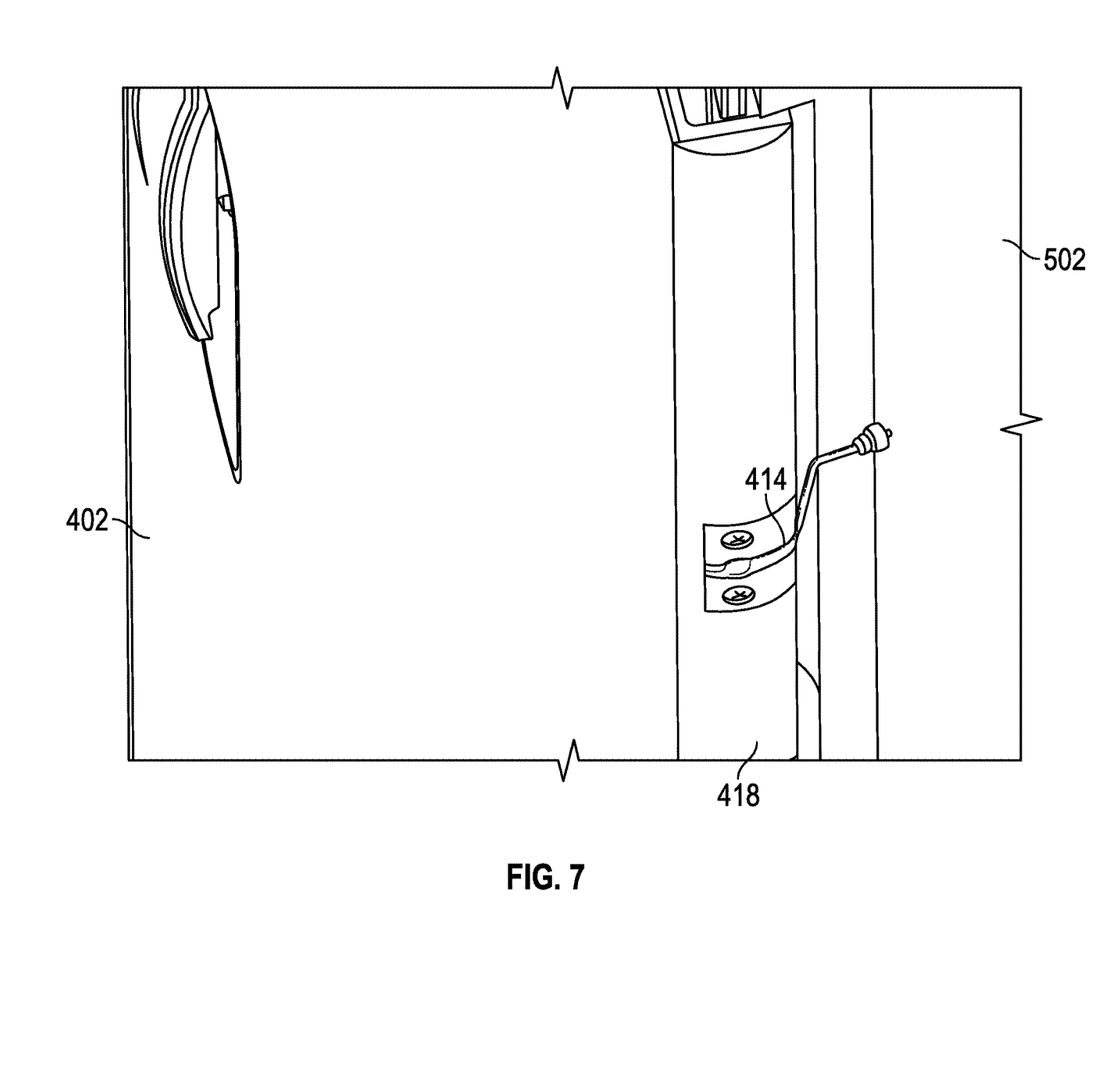
FIG. 7 is a detail view illustrating the cable and cam configuration of the retractable door header in accordance with the disclosed embodiments.

FIGS. 5-7 illustrate the cabin door system 500 in both the open and closed position. In FIG. 5, the door panel 402 with the retractable header 404 is installed in a bulkhead 502. As can be seen, the retractable header 404 is in a raised position and the arcuate top portion completes the arc across the bulkhead to interface with the aircraft ceiling (or headliner). In FIG. 6, the door panel 402 is shown in the open position with the retractable header 404 retracted into the door panel 402. This facilitates easy opening and closing the door panel enabling a passenger to easily move between compartments (see FIG. 2). FIG. 7 is a detail view illustrating the cable 414 coupled to the bulkhead 502. As noted above, as the door panel is moved toward the open position, cable 414 is placed under tension via the cam 418 mounted to a side of the door panel 402. The cable causes the four-bar system to retract into the door panel 402 (see FIG. 4 and associated text).

The disclosed embodiments provide an aircraft with an improved cabin door system operates a retractable header via an improved lift system. This offers passengers privacy while facilitating door operation.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other through one or more additional elements.

While at least one exemplary embodiment has been presented in the foregoing detailed description, it should be appreciated that a vast number of variations exist. For example, although the disclosed embodiments are described with reference to a door used on an aircraft, those skilled in the art will appreciate that the disclosed embodiments could be implemented in other types of vehicles. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An interior cabin door for an aircraft, comprising:
a door panel having an opening in a top portion thereof;
a retractable header configured to retract into the opening in the door panel as the door panel moves toward an open position; and
a lifting system configured to raise the retractable header when the door panel moves toward a closed position, the lifting system comprising:
a first bar and a second bar coupled to the door panel and the retractable header;
a cable and pulley system having one or more pulleys coupled to the door panel and the cable being configured to be coupled at a first end to a bulkhead and coupled at a second end to the first bar; and
a biasing member coupled to the door panel and the second bar configured to upwardly bias the retractable header.

2. The interior cabin door of claim 1, wherein the door panel comprises a pivoting door panel of an aircraft cabin door system.

3. The interior cabin door of claim 1, wherein the biasing mechanism comprises a spring member.

4. The interior cabin door of claim 1, further comprising a guide coupled to the door panel for guiding the retractable header toward a retracted position as the door panel moves toward the open position.

5. The interior cabin door of claim 1, further comprising guides in the retractable header to receive and guide the first bar and second bar.

6. The interior cabin door of claim 5, further comprising a tension member coupled to the retractable header and the second bar.

7. The interior cabin door of claim 6, wherein the tension member comprises a spring.

8. An interior cabin door system for an aircraft, comprising:
a bulkhead having an opening therein for receiving a door panel, the door panel having an opening in a top portion thereof;
a retractable header configured to retract into the opening in the door panel as the door panel moves toward an open position; and
a lifting system configured to raise the retractable header when the door panel moves toward a closed position, the lifting system comprising:
a first bar and a second bar coupled to the door panel and the retractable header;
a cable and pulley system having one or more pulleys coupled to the door panel and the cable being configured to be coupled at a first end to the bulkhead and coupled at a second end to the first bar; and
a biasing member coupled to the door panel and the second bar configured to upwardly bias the retractable header.

9. The interior cabin door of claim 8, wherein the door panel comprises a pivoting door panel of an aircraft cabin door system.

10. The interior cabin door of claim 8, wherein the biasing mechanism comprises a spring member.

11. The interior cabin door of claim 8, further comprising a guide coupled to the door panel for guiding the retractable header toward a retracted position as the door panel moves toward the open position.

12. The interior cabin door of claim 8, further comprising guides in the retractable header to receive and guide the first bar and second bar.

13. The interior cabin door of claim 12, further comprising a tension member coupled to the retractable header and the second bar.

14. An aircraft, comprising:
one or more engines for propelling the aircraft;
a fuselage having a passenger cabin;
one or more bulkheads within the passenger cabin, at least one of the one or more bulkheads having an opening therein for receiving a door panel having an opening in a top portion thereof;
a retractable header configured to retract into the opening in the door panel as the door panel moves toward an open position; and
a lifting system configured to raise the retractable header when the door panel moves toward a closed position, the lifting system comprising:
a first bar and a second bar coupled to the door panel and the retractable header;
a cable and pulley system having one or more pulleys coupled to the door panel and the cable being configured to be coupled at a first end to a bulkhead of the one or more bulkheads and coupled at a second end to the first bar; and
a biasing member coupled to the door panel and the second bar configured to upwardly bias the retractable header.

15. The interior cabin door of claim 14, wherein the door panel comprises a pivoting door panel of an aircraft cabin door system.

16. The interior cabin door of claim 14, wherein the biasing mechanism comprises a spring member.

17. The interior cabin door of claim 14, further comprising a guide coupled to the door panel for guiding the retractable header toward a retracted position as the door panel moves toward the open position.

18. The interior cabin door of claim 14, further comprising guides in the retractable header to receive and guide the first bar and second bar.

19. The interior cabin door of claim 18, further comprising a tension member coupled to the retractable header and the second bar.

20. The interior cabin door of claim 19, wherein the tension member comprises a spring.

\* \* \* \* \*